(Model.)

C. C. DAVIS & W. H. MERCER.
COTTON SCRAPER.

No. 257,666. Patented May 9, 1882.

Witnesses:
W. W. Mortimer
W. H. Kirv

Inventors:
C. C. Davis
W. H. Mercer
per F. A. Lehmann, atty

United States Patent Office.

CHARLES C. DAVIS AND WILLIAM H. MERCER, OF MERCER, SOUTH CAROLINA.

COTTON-SCRAPER.

SPECIFICATION forming part of Letters Patent No. 257,666, dated May 9, 1882.

Application filed February 23, 1882. (Model.)

*To all whom it may concern:*

Be it known that we, C. C. DAVIS and W. H. MERCER, of Mercer, in the county of Union and State of South Carolina, have invented certain new and useful Improvements in Cotton-Scrapers; and we do hereby declare the following to be a full, clear, and exact description of the invention, such as will enable others skilled in the art to which it pertains to make and use it, reference being had to the accompanying drawings, which form part of this specification.

Our invention relates to an improvement in cotton-scrapers; and it consists in the combination of the frame, made in a single piece with the standards, and a shaft having two cutting-wheels attached thereto, which run just inside of the two scrapers, as will be more fully described hereinafter.

The object of our invention is to produce a scraper for cotton, corn, and other plants, and which is so constructed that the two cutting-wheels run along upon opposite sides of the plants and press the earth toward them, so as to pack it around their roots, while the scrapers cut away the weeds which may be growing around their sides.

Figure 1:
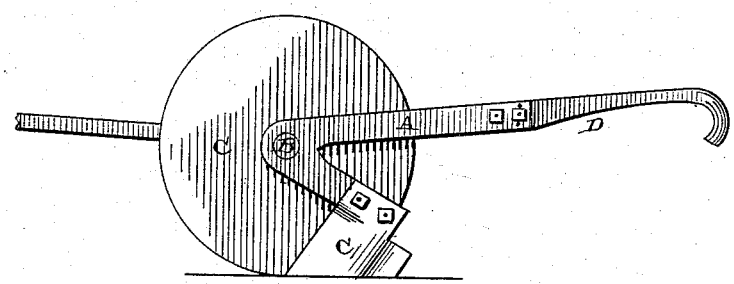
Figure 2:
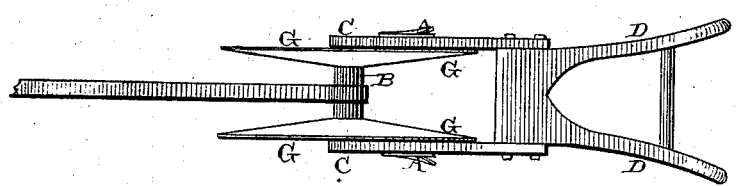
Figure 3:
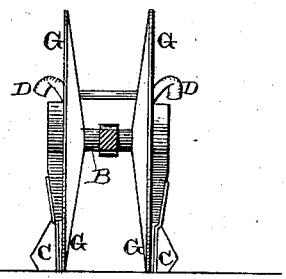

Figure 1 is a side elevation of our invention. Fig. 2 is a plan view of the same. Fig. 3 is a front elevation.

A represents the two beams, which here form not only the sides of the frame, but the journals for the shaft B and the standards for the scrapers C. These portions of the beam which form the sides of the frame extend backward at any suitable angle, and have the handles D secured to them. The rear ends of the beams are rigidly fastened to the inner ends of the handles, and thus the two beams are held rigidly in position. The shaft B, which is provided with the two cutting-wheels G, is journaled in the front portions of these two beams A at that point where they are turned downward and backward to have the scrapers C secured to them. These wheels may be formed in a single piece with the shaft, or they may be formed separately and then secured together, so that they will all turn together. The edges of these wheels are made sharp, so as to cut down along opposite sides of the plants, and while their outer edges are made straight and vertical, their inner sides are made convex, as shown, so as to press the earth inward toward the plants and pack it around their roots. The scrapers C are so shaped that they are almost in contact with the outer sides of the wheels, and they scrape and cut away the growing weeds from around the plants as the machine is drawn forward. The draft-bar, or other attachment by means of which the animal is fastened to the machine, is fastened to the beam B at its center and projects a suitable distance forward.

By constructing the beams in the form here shown all necessity for forming a frame in which to journal the shaft is done away with and the construction of the machine is greatly simplified and cheapened.

Having thus described our invention, we claim—

In a cotton-scraper, the combination of the two beams A, each made in a single piece with the standards, and having the handles D secured between their rear ends, the shaft B, having the two cutting-wheels G secured thereto, and the scrapers C, which cut close to the outsides of the wheels, substantially as shown and described.

In testimony whereof we affix our signatures in presence of two witnesses.

CHARLES CHRISTOPHER DAVIS.
WILLIAM HENRY MERCER.

Witnesses:
D. W. TATE,
M. BISHOP.